June 17, 1969

G. S. WING 3,449,998

INHERENTLY TORQUE-LIMITED FASTENER

Filed Jan. 31, 1968

INVENTOR.
GEORGE S. WING.
BY
*Angus & Mon*
ATTORNEYS.

June 17, 1969  G. S. WING  3,449,998
INHERENTLY TORQUE-LIMITED FASTENER
Filed Jan. 31, 1968  Sheet 2 of 2

INVENTOR.
GEORGE S. WING.
BY Angus & Mow
ATTORNEYS.

United States Patent Office 3,449,998
Patented June 17, 1969

3,449,998
INHERENTLY TORQUE-LIMITED FASTENER
George S. Wing, Torrance, Calif., assignor to Hi-Shear Corporation, Torrance, Calif., a corporation of California
Filed Jan. 31, 1968, Ser. No. 702,028
Int. Cl. F16b *31/00, 33/04*
U.S. Cl. 85—61                          8 Claims

ABSTRACT OF THE DISCLOSURE

One piece inherently torque-limited fasteners wherein the level of torque which can be applied to the fastener is limited by the fracture of a shear section which parts to leave one portion of the fastener threaded onto a threaded element at some desired torque level, without the means by which torque was applied, thereby preventing application of additional torque. The section where the fracture occurs is perforated preferably by the intersection of a surface which has a major and a minor lateral dimension by a circular surface whose radius is less than the major and greater than the minor dimension. The two portions of the fastener which are connected by the shear section may be at least in part axially overlapped.

---

This invention relates to one piece inherently torque-limited fasteners which include a driving portion and engagement portion that are joined by a shear section which fractures when counter-torque of a predetermined level is exerted on the portions. This fracture separates the driving portion from the engagement portion, leaving the latter engaged to a threaded element such as a bolt, and disconnects from the engagement portion the means for applying torque to it, so that no additional torque can be applied to the engagement portion once it is set to that torque level.

A fastener of the above class is shown in George S. Wing Patent No. 2,940,495, issued June 14, 1960. In this class of device, there is characteristically disposed at one region a circular surface on one wall of the fastener and an aligned groove on the other wall. This forms a shear section which is a circular annulus. Such a construction has proved to work very well, and it is in widespread use for a broad range of applications. There are, however, some limiting parameters which result from the use of a continuous uninterrupted annular shear web, which parameters limit the utility of the device especially as to the materials of construction which can be used for certain torque levels.

The shear web has three principal functions. The first such function is structural. It holds the driving portion and the engagement portion together until the predetermined torque has been applied. The second function is one of transmission of torque. This shear section must resist torque levels below that to which the fastener is to be set, and transmit torque from the driving portion to the engagement portion at such lower levels. The third function is to fracture at the predetermined torque, thereby disconnecting the driving portion from the engagement portion.

It is axiomatic that because the torque level at which the shear section fractures must be closely predictable, it is essential for the dimensions of the shear web at that section to be made to very close tolerances. Also, it can generally be stated that the lower the torque level at which fracture is to occur, the smaller will be the cross-sectional area, and the closer together will be the inner and outer dimensions of an annular shear section.

Fasteners of this class are frequently made entirely by turning operations, and sometimes they are also made by a combination of punching, broaching, heading, and turning operations. Speaking generally, however, the groove referred to above will be formed by a turning operation and represents the machining of a critical shape to very close tolerances. Of course this will be accomplished with a cutting tool which exerts certain forces, especially drag, which appears as torque to the fastener while the device is being manufactured. If the shear web is too thin, this drag can actually be of the same order of magnitude as the torque intended to be required to fracture the shear web, and the fastener will be destroyed during the course of its manufacture, meaning of course that fasteners with some combinations of dimensions and materials cannot be made at all. Unfortunately, many useful fasteners lie within this range.

Other limiting parameters include certain physical properties of the material such as ductility and tensile strength. If, for example, steel were the material and the torque level at which the shear web is to fracture is relatively low, then the shear web would have to be so thin as to be impractical to manufacture, and even normal manufacturing tolerance variations would represent a very high percentage error relative to the torque at which the web should fracture. This places an unfortunate restriction on the use of strong materials which might also be useful for other desirable properties such as corrosion resistance and strength at elevated temperatures.

It is an object of this invention to provide a fastener structure of the general class described in which there is a broadened range of predetermined torque levels available for a fastener of a given nominal size and material, and a novel method for making the structure. In essence, it comprises grouping the material of the shear web at spaced-apart sections, which sections are thicker than a continuous annular web would be. This reduces the effect of tool drag and of tolerances.

A fastener according to this invention comprises a unitary structure that includes an engagement portion and a driving portion, which portions are connected by and separated from each other by a shear section, which shear section is the region having the least resistance to counter-torque exerted between the two portions. The shear section is defined by the continuous intersection of two coaxial surfaces, each disposed on a respective wall of the fastener. A first of the surfaces is non-circular. It has a major dimension and a minor dimension, the major dimension being larger than the minor dimension. The second of these surfaces is circular, and its radius is larger than the minor dimension and smaller than the major dimension. One of these surfaces constitutes the inner wall of a symmetrical hollow body. The proportions are such that the second surface intermittently perforates the first surface. Both of the surfaces are closed except to the extent that they are interrupted by the perforations. The shear section is thereby formed as an intermittent structure by easily-controlled operations which might include punching and turning, for example, and the material of the shear section which is to fracture, while intermittent, has relatively larger cross-sectional groupings than would be the case with a continuous and uniform annulus.

According to a preferred but optional feature of the invention, the engagement portion and the driving portions are at least in part axially overlapped. According to another preferred but optional feature of the invention, one of said intersecting surfaces is circular, and the other one is regularly polygonal.

The above and other features of this invention will be fully understood from the following detailed description and the accompanying drawings in which.

Figure 1:
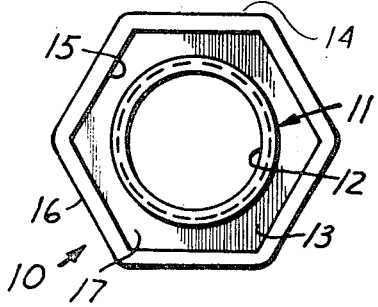
FIGS. 1 and 2 are top and side elevations, respectively, of a blank from which the presently preferred embodiment of the device is made.
Figure 2:
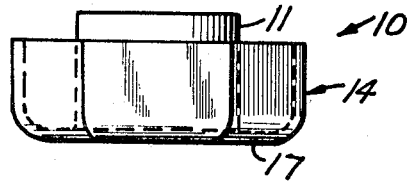

In FIG. 1, there is shown a blank 10 for making the presently preferred embodiment of the nut of this invention. There is a tubular central portion 11 with an internal thread 12, a dished relief 13, an outer peripheral wall 14 having a regularly hexagonal inner surface 15, and a regularly outer surface 16. Surfaces 15 and 16 are non-circular. The tubular portion and the outer peripheral wall are connected by a flange 17 so that the structure is integral. This structure can easily and very accurately be formed by a punching operation, and the thread may be formed by a tapping operation.

Figure 3:
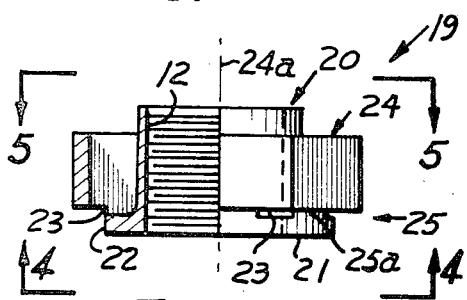
FIG. 3 is an axial view, partly in cross-section, showing the presently preferred embodiment of the invention.
Figure 4:
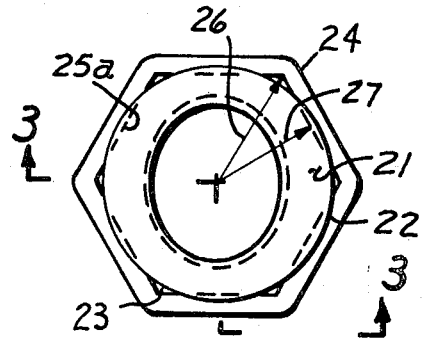
FIGS. 4 and 5 are bottom and top views, respectively, of FIG. 3.
Figure 5:
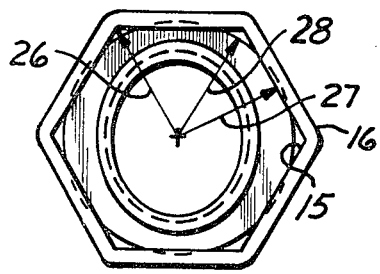

The blank is ready for formation into the final embodiment shown in FIGS. 3–5 wherein it will be seen that fastener 19 made from blank 10 is formed with an engagement portion 20 derived from the tubular portion 11, with thread 12 running therethrough. A flat annular contact surface 21 has been machined on the bottom. A circular surface 22 has been machined into the flange and into the dished relief so as to intersect the same, thereby forming a plurality of perforations 23. The outer part forms a driving portion 24, the outer wall forming wrench engagement means. The fastener has a central axis 24a, and both portions are coaxial on it, and in this embodiment they overlap. The perforations lie in a region referred to as shear section 25, which constitutes a plurality of post-like elements 25a that are angularly spaced apart by the perforations. The inherent resistance to torque will be defined by this shear section when the fastener is tightened down by turning the driving section, with the contact surface 21 bearing against a workpiece. Torque below the inherent level will be transmitted from the driving portion to the engagement portion. when the inherent torque limit level is reached, section 25 will fracture.

It will be noted that the tubular port of the engagement portion has been deformed out of round. When this is threaded onto a circular bolt, it will be forced back into round, and its springback force will exert a gripping action on the threads of the bolt.

The salient features of the surfaces used to form the shear section are illustrated in FIG. 5. In this example, the hexagonal inner surface 15 has a major dimension 26 and a minor dimension 27. The major dimension extends to the inside corners from the central axis, and the minor dimension extends perpendicular to the inside flats of this surface. Radius 28 of the circular surface is larger than the minor and smaller than the major dimension. The circular surface intersects the inner surface 15 and forms the perforations as aforesaid. It will be noted that both the surfaces are closed, continuous and coaxial. They are both preferably, but not necessarily, regular in the geometrical sense.

Figure 6:
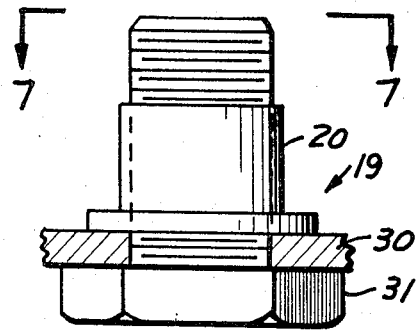
FIG. 6 is a side elevation, partly in cutaway cross-section, showing the fastener of FIG. 3 installed.
Figure 8:
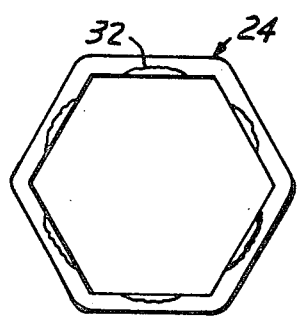
FIG. 8 is a plan view of a separated portion of the device installed in FIG. 6.
Figure 7:
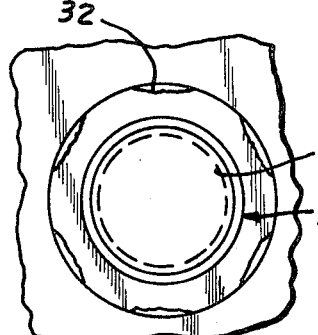
FIG. 7 is a top view of FIG. 6.

FIG. 6 shows a fastener 19 of FIG. 3 threaded down against a workpiece 30 and onto a bolt 31, clamping the workpiece in place between itself and the head of the bolt. The engagement portion remains in place as does the remaining portion of the flange, but the driving portion has sheared off. In FIG. 8, the shear regions 32 are schematically shown. FIG. 7, which is a top view, also shows the shear regions 32 schematically. These will generally be merely roughened areas as is characteristic of sheared surfaces.

Figure 9:
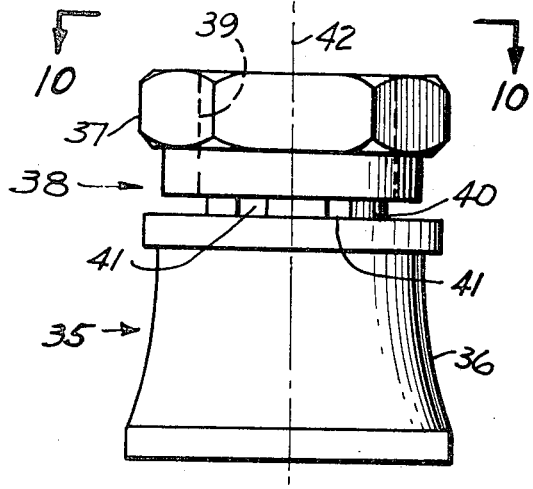
FIG. 9 is a side elevation of another embodiment of the invention.
Figure 10:
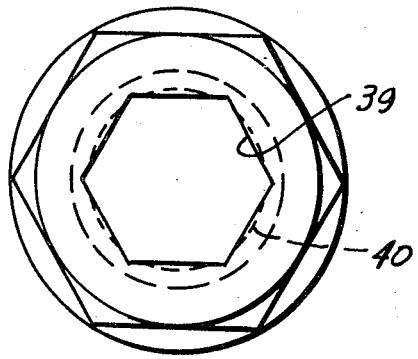
FIG. 10 is a top view of FIG. 9.

In FIG. 9, there is shown a fastener 35 which is generally similar in structure to that shown on the aforesaid Wing Patent No. 2,940,495. In fact, it differs only in the nature of the shear section. In this embodiment, the engagement portion 36 and the driving portion 37 are axially aligned, and do not overlap as they do in FIG. 3. Instead, these portions are aligned and axially spaced from one another, joined by a shear section 38. In FIG. 10, the driving portion and shear section of the fastener are shown as having a hexagonal inner surface 39. A cirrcular surface 40 is cut into the outer wall with the size of its radius lying between the major and the minor dimension of the hexagonal surface as in FIG. 3. This creates a plurality of perforations 41. The device has a central axis 42. Turning the driving section with a predetermined torque relative to the engagement section will cause the fracturing action.

Figure 11:
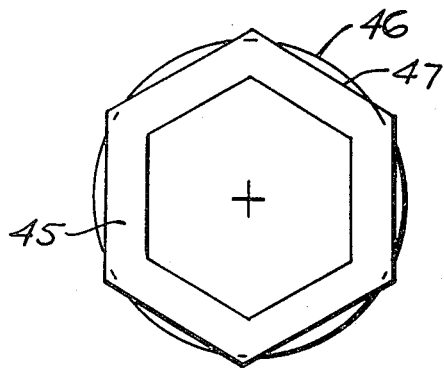
FIG. 11 is a schematic view showing a reversal of surfaces from the construction of FIG. 3.
Figure 12:
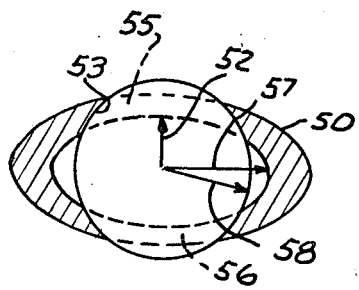
FIG. 12 schematically illustrates the use of one non-circular and also non-polygonal surface.

FIGS. 11 and 12 illustrate other geometric situations and are shown only in general scheme. In FIG. 11, a hexagonal peripheral wall 45 similar to wall 14 is shown, but in this case the circular surface 46 is generated on the inside, while the outer wall 47 is the one with the pertinent major and minor dimensions, rather than the inner wall as in FIG. 3. Such a construction may readily be formed with an undercutting tool, and will leave regions connected at the corners of the hexagon instead of at the middle of the flats as is the case in FIG. 3. Circle 46 is shown completed as a geometrical, rather than as a structural illustration. Its only structural fragments are those shown by dotted line, at the corners of the hexagon, the circle having been generated from the inside.

FIG. 12 shows schematically and in cross-section, a wall 50 which is elliptical in nature, having a major dimension 51 and a minor dimension 52. A circular surface 53 is cut from the inside which has a radius 58 whose value lies between the major and minor dimensions, and thereby forms two perforations 55, 56. FIG. 12 also illustrates that more or fewer than six perforations may be used. Again, the complete circle is shown only for geometrical clarity.

The method of making the aforesaid device is greatly superior to attempting to form perforations by lateral punching or sawing. For one thing, the surfaces are all made by simple tooling and closely controllable operations. The shear section is formed in a plane which is normal to the central axis of the device, which would be most difficult to control with punching or sawing operations performed laterally. The edges of the perforations feather nicely to an edge, and there are no substantial shear concentration areas or notches formed such as would be the case by standard sawing operations.

In all embodiments, the circular surface may be a sharp, rounded or flat-bottomed groove. In general, the non-circular surface will have a considerable flat axial extent, because it is easier to make it in that form by heading or punching.

This invention thereby provides a method and a new type of device which may, if desired, have a relatively low profile, and which may use materials of wide variety of physical properties over a wide range of ultimate inherent torque limitations, all of which may be formed by standard and convenient manufacturing techniques.

This invention is not to be limited by the embodiments shown in the drawings and described in the description which are given by way of example and not of limitation.

I claim:

1. A one piece inherently torque-limited fastener having a central axis and comprising an engagement portion having a central threaded passage therethrough; a driving portion having driving surfaces thereon; and a shear section interconnecting the two portions, the strength of said shear section under torque being a function at least in part of the inherent strength of its material and of its dimensions and proportions, said shear section defining the minimum cross-sectional area of the fastener to form the weakest region of the fastener when under torque, whereby the driving portion will torque off from the engagement portion at the shear section when a predetermined counter-torque is applied to the two portions, the shear section being defined by a pair of coaxial surfaces, one of which defines a symmetrical hollow body, one of which is a non-circular, closed, continuous surface having major and minor dimensions measured from the central axis, the major dimension being greater than the minor dimension, and the other surface being a circular surface whose radius from the central axis lies between the said major and minor dimensions, whereby a plurality of circumferentially spaced apart apertures are formed through the wall of the shear section.

2. A one piece inherently torque-limited fastener according to claim 1 in which the two portions are axially aligned and spaced apart.

3. A one piece inherently torque-limited fastener according to claim 1 in which the driving portion is outside of and overlaps at least a portion of the engagement portion.

4. A one piece inherently torque-limited fastener according to claim 3 in which the circular surface is formed as an circular cylinder adjacent to one end of the fastener and extends axially above a flange connecting the two portions.

5. A one piece inherently torque-limited fastener according to claim 1 in which the circular surface is on the outside wall of the engagement portion and in which the non-circular surface is polygonal and is on the inside wall of the driving portion.

6. A one piece inherently torque-limited fastener according to claim 5 in which the polygonal surface is a regular hexagon.

7. A one piece inherently torque-limited fastener according to claim 1 in which the polygonal surface is on the outside wall of the driving portion.

8. A one piece inherently torque-limited fastener according to claim 7 in which the driving portion is outside of and overlaps at least a portion of the engagement portion.

References Cited

UNITED STATES PATENTS

| 745,531 | 12/1903 | Sholes | 151—68 |
| 1,808,318 | 6/1931 | Pleister | 85—72 |
| 2,985,291 | 5/1961 | Schoepe et al. | 285—3 |

FOREIGN PATENTS

| 631,004 | 11/1961 | Canada. |
| 1,023,639 | 1/1958 | Germany. |

CARL W. TOMLIN, *Primary Examiner.*

RAMON S. BRITTS, *Assistant Examiner.*

U.S. Cl. X.R.

10—86